** 2,749,444

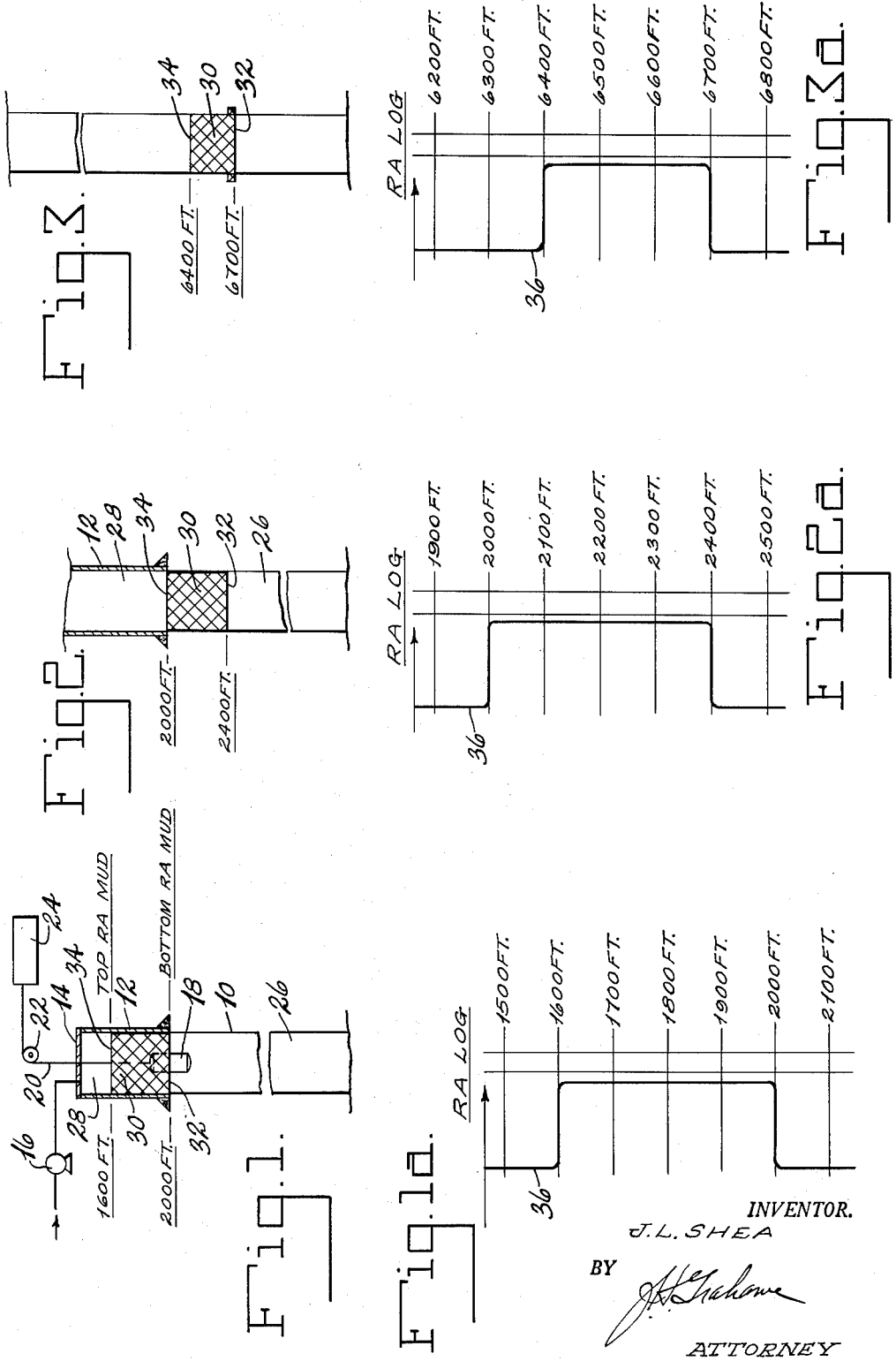

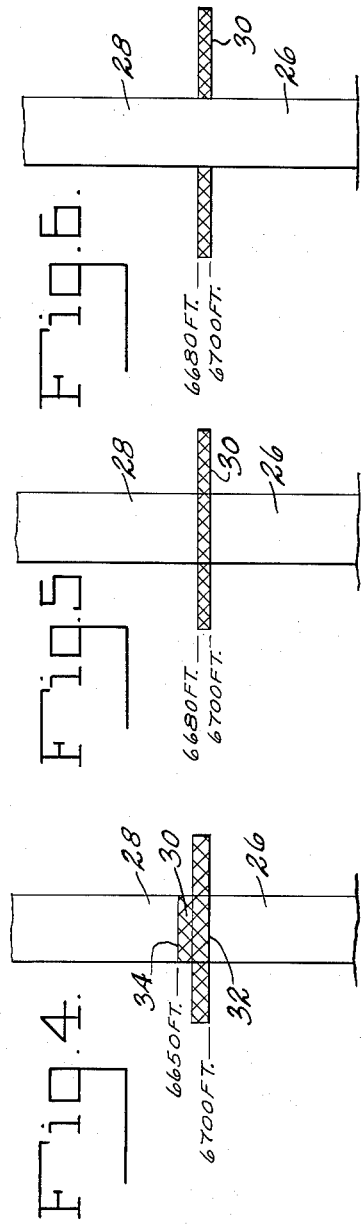

METHOD OF LOCATING A ZONE OF LOST CIRCULATION

Joseph L. Shea, New Orleans, La., assignor to The Texas Company, New York, N. Y., a corporation of Delaware Application April 20, 1953, Serial No. 349,705

1 Claim. (Cl. 250—43.5)

This invention relates to the subsurface exploration of the earth and more particularly to a method of locating a zone or formation traversed by a well or bore hole into which zone some or possibly all of the drilling fluid used in the drilling of the well passes and is lost. The principal object of the invention is the provision of a method of this type by means of which the depths of both the lower and upper boundaries of a permeable zone such as a zone of lost circulation can be accurately determined.

In rotary drilling operations, a fluid, generally called drilling mud, is circulated down through the drill pipe and the bit, and back to the surface on the outside of the drill pipe. The purpose of this mud is to carry the bit cuttings out of the hole, lubricate and cool the bit, help support the formations drilled, and prevent formation fluids from entering the hole by over-balancing the formation fluid pressure. In order to support some formations and/or to control high pressure formation fluids, it is necessary to increase the specific gravity, or so-called "weight" of the mud by the addition of finely ground high specific gravity solids which are held in suspension by the mud.

Another important characteristic or property of drilling mud is its ability to deposit a filter cake on permeable formations such as water, oil, and gas sands. This filter cake supports the formation and prevents the loss of drilling mud into these formations. There are cases, however, when all, or part, of the mud pumped into the drill pipe does not return to the surface and the mud level in the hole may or may not drop. When this happens, it is called "lost returns," or "lost circulation," and in practically all cases it is necessary to stop drilling until circulation can be regained.

The causes of lost returns can usually be attributed to one or a combination of the following reasons: a formation has been drilled which is either highly fractured, fissured, cavernous, or coarse grained with openings too large to support a filter cake; or a relatively weak formation has been drilled and the hydrostatic head of the column of mud in the hole is sufficient to cause this formation to break down, fracture, or otherwise open up and take mud. In many cases of this nature, the formation may hold mud for some time, but later break down when the mud weight is raised.

In the past, the usual method of combating lost circulation has been to reduce the mud weight, if possible, and to add fibrous or flaky material, such as shredded wood fiber, etc., to the mud in an effort to plug off the formation taking mud. This method has proved only moderately successful in most cases and has completely failed in a great many others, especially where the loss is due to the formation breaking down and where the mud weight cannot be reduced without a blowout. At the present time, it is believed the best method of correcting lost returns is to squeeze off the zone taking mud with cement or high gel mud.

When it is necessary to cement or otherwise seal off the zone of lost circulation or lost returns, it is of course necessary to know accurately where this point or zone of lost return is located. When returns are lost in a well, mud in the hole above the lost returns zone will tend, as additional mud is lost, to move down the hole to the zone of lost returns and here enter the formation in a more or less horizontal direction away from the hole. Therefore, if a small volume of easily traceable mud is added to the hole at a point above the lost returns zone and is made to migrate downward in the hole by pumping in additional mud, the point or zone at which this added mud stops moving down or leaves the hole will define the lost circulation zone.

In the method to be described, a quantity of mud sufficient to occupy the volume of about one hundred feet to six hundred feet of open hole is made radioactive by the addition of a small amount of a radioactive material such as ground carnotite to a degree that it is easily identifiable in any part of the hole by means of a radioactivity well logging instrument passed through the hole. This radioactive mud is then pumped into the well, followed by non-radioactive mud, and the radioactive mud is traced with the radioactivity logging instrument as it moves down the hole. In some cases where the hole will stand full, the mud must be squeezed out by pump pressure into the formation taking the mud. When the point is reached at which the further addition of mud at the surface does not cause the bottom of the radioactive mud column to move farther down the hole, the bottom of the lost returns zone has been located. More mud added at the surface will now cause the radioactive mud column to shorten vertically as it goes out into the formation. In other words, the interface between the radioactive mud and the drilling mud fluid already in the hole will cease falling at the lower boundary of the lost returns zone and the upper interface, that is, the interface between the radioactive mud and the mud which is pumped in on top of the radioactive mud will continue to fall. A point will soon be reached, however, where the top of the radioactive mud column also stops falling as additional mud is pumped in, and the top of the radioactive column is then opposite the top or upper boundary of the lost returns zone. Additional pumping will merely cause the radioactive mud to be pushed farther back into the formation and eventually to be carried too far to be located by the radioactivity logging instrument. By this procedure, both the top and the bottom of the lost circulation zone are located.

For a better understanding of the invention, reference may be had to the accompanying drawings in which Figures 1, 2, 3, 4, 5, and 6 illustrate various stages or positions of the radioactive mud column as it travels down the bore hole and is eventually lost in the zone of lost circulation. Figures 1a, 2a, 3a, 4a, 5a, and 6a illustrate diagrammatically the radioactivity log which would be obtained when measuring the position of the radioactive mud fluid in the corresponding figures.

Referring to the drawing, Figures 1-6 illustrate a hypothetical case where a bore hole of some 7000 feet in depth has traversed a permeable zone into which drilling mud has been lost. Thus, in Figure 1 a bore hole 10 is shown as having a casing 12 lining its upper portion and sealed in at 14 as by means of a suitable casing head. A pump 16 is shown as connected to the casing head, and this pump may serve to force a mud or other solution into the well as will be described. A radioactivity logging instrument indicated at 18 is shown as suspended in the well or bore hole by means of the conductor cable 20, which cable passes over a suitable cable-measuring device 22 which will indicate at all times the depth or position of the instrument 18 in the hole. The instrument 18 contains a detector of gamma radiation, and the output of the detector passes up through the cable 20 to a suitable recording device 24 which may also contain an amplifier for the signals from the detector. It is assumed that the drilling mud 26 in the lower portion of the hole is being lost or, in other words, that at least a portion of this mud is passing outwardly into some formation or zone of lost circulation, and it is the main purpose of this invention to find this zone so that remedial steps may be taken to cement or otherwise seal the exposed surface of the zone so that drilling operations can continue.

A quantity of mud to which a small amount of a radioactive substance, such, for example, as ground carnotite, has been added is pumped into the upper end of the well and, in the example shown in the drawing, a quanity of mud is used sufficient to fill about 400 feet of the well. Another mud fluid which is not radioactive is pumped into the well on top of the radioactive mud as shown in Figure 1, this upper fluid being indicated at 28 and the radioactive mud being indicated by the reference character 30. An interface 32 will exist between the radioactive mud 30 and drilling mud 26, and another interface 34 will exist between the radioactive mud 30 and the mud 28.

In Figure 2 it will be observed that the mass of radioactive mud 30 has been pumped downwardly until the lower interface 32 has reached a depth of 2400 feet while the upper interface is at the depth of 2000 feet. It is understood that although the radioactivity logging instrument 18 is shown only in Figure 1, this instrument is passed through the hole more or less continuously or at least at frequent intervals so as to determine the depths of the two interfaces 32 and 34. It is believed obvious that when the instrument 18 passes from the non-radioactive mud 28 into the radioactive mud 30, the record or log being made by the recording device 24 will show a sudden increase in detector response or output and, knowing the depth of the instrument in the hole at that time, as indicated by the device 22, the operator will be apprised of the exact depth of the upper interface. Likewise, as the detector is lowered still farther, it will pass from the radioactive mud into the non-radioactive drilling mud 26 and as it passes the interface 32 the record will show another sudden change, in this case a decrease in intensity, and by correlating this with the depth of the detector in the hole at that time, the operator will know the exact depth of the lower interface 32.

In Figure 3 it will be observed that the radioactive mud 30 has passed downwardly into the hole until the lower interface 32 has reached a depth of 6700 feet. In measuring the depths of the two interfaces at that time, the operator will observe that the upper interface 34 is at a depth of 6400 feet. Since the original length or height of the radioactive mud column 30 was 400 feet, the operator will now note that the column has shortened to 300 feet and will thus be apprised that some of the radioactive mud is passing into a permeable zone which, in all probability, is the zone of lost circulation being looked for.

Figure 1a illustrates the radioactivity log or record which would be made by the recording device 24 when the radioactive mud 30 is positioned in the well at the depth shown in Figure 1. Thus the log curve 36 shows that the lower interface 32 at that time was at a depth of 2000 feet while the upper interface 34 was at a depth of 1600 feet. In like manner, Figure 2a shows that in the position of the radioactive mud illustrated in Figure 2, the lower and upper interfaces 32 and 34 were at the depths of 2400 feet and 2000 feet, respectively. Again, Figure 3a indicates that while the lower interface 32 has reached a depth of 6700 feet, the upper interface has gone down to 6400 feet, thus indicating a vertical height of the radioactive mud 30 as 300 feet instead of the original 400 feet.

In Figure 4, it will be noted that the further addition of non-radioactive mud 28 above the radioactive mud 30 has caused the upper interface 34 to fall to a depth of 6650 feet, as indicated in the log of Figure 4a, while the lower interface 32 still remains at the depth of 6700 feet. Still more non-radioactive mud 28 is pumped into the bore hole, as indicated in Figure 5, and the radioactivity log of Figure 5a shows that the lower interface remains at 6700 feet while the upper interface has gone down to 6680 feet, leaving only 20 feet, as measured vertically, of the mud in the hole. In Figure 6, it is shown that all of the radioactive mud 30 has passed outwardly from the hole into the zone of lost circulation, and the only liquids then left in the hole are the non-radioactive muds 28 and 26. Since the radiation detector will still respond to the radioactive mud 30 around the bore hole, the log of Figure 6a will be similar to the log of Figure 5a. If additional mud is pumped into the upper end of the bore hole, the radioactive mud 30 will be forced farther out into the permeable zone until its radiation will be too weak to be picked up by the detector and shown in the record.

From the hypothetical case which has been described in the foregoing, it will be seen that the operator will know exactly the depths or positions in the hole of the upper and lower interfaces 34 and 32 and in the example given, he will know that the interfaces never came closer together than 20 feet and that therefore the zone of lost circulation was 20 feet in thickness and positioned between 6680 feet and 6700 feet in depth.

It will be noted that the example given is more or less an ideal case. Thus, the radioactive log may not be a smooth curve, as indicated at 36 but may also contain indications of the natural radioactivity of the formations traversed by the bore hole. If desired, one can first make a conventional natural gamma ray log of the formations around the bore hole to be used as a comparison in case there is any doubt in interpreting the logs made after the radioactive mud has been placed in the hole. Furthermore, the usual bore hole of a well is not always of uniform diameter and there may therefore be slight changes in the length of the radioactive mud column as the mud moves down the hole. It has been found that these variations are not of great importance.

While radioactive mud has been described as the material to be followed through the bore hole, it is understood that the invention contemplates the use of any material as a tracer which will render a mass of fluid identifiable. For example, a liquid may be used which has different electrical properties or other different physical properties from the liquids above and below.

Obviously, many modifications and variations of the invention as hereinbefore set forth may be made without departing from the spirit and scope thereof, but only such limitations should be imposed as are indicated in the appended claim.

I claim:

The method of locating a zone or formation where drilling fluid has been lost in the drilling of a bore hole which comprises forcing downwardly in the hole on top of the non-radioactive well liquid normally present in the bore hole a column of a liquid containing a radioactive tracer material followed by a non-radioactive liquid, said column of tracer-containing liquid being longer vertically than the vertical thickness of the formation to be located, locating and following by radioactivity measurement the downward progress of the interface between the radioactive liquid and the non-radioactive liquid below the radioactive liquid, and noting the depth in the hole at which said interface ceases to fall, said noted depth defining the lower boundary of the zone of lost circulation, following the downward movement of the upper interface between the radioactive liquid and the non-radioactive liquid thereabove after the lower interface has ceased falling, and noting the depth at which said upper interface ceases falling, the said noted depth of the upper interface defining the upper boundary of the zone of lost circulation.

References Cited in the file of this patent

UNITED STATES PATENTS

| | | |
|---|---|---|
| 2,446,588 | Herzog et al. | Aug. 10, 1948 |
| 2,450,265 | Wolf | Sept. 28, 1948 |
| 2,648,014 | Arthur | Aug. 4, 1953 |